(12) United States Patent
Craig

(10) Patent No.: US 7,022,266 B1
(45) Date of Patent: Apr. 4, 2006

(54) PRINTABLE COMPOSITIONS, AND THEIR APPLICATION TO DIELECTRIC SURFACES USED IN THE MANUFACTURE OF PRINTED CIRCUIT BOARDS

(75) Inventor: Hugh P. Craig, Usk (GB)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/242,388

(22) PCT Filed: Aug. 15, 1997

(86) PCT No.: PCT/IB97/01033

§ 371 (c)(1),
(2), (4) Date: Nov. 22, 1999

(87) PCT Pub. No.: WO98/08362

PCT Pub. Date: Feb. 26, 1998

Related U.S. Application Data (60) Provisional application No. 60/024,026, filed on Aug. 16, 1996.

(51) Int. Cl.
*H01B 1/02* (2006.01)

(52) U.S. Cl. .................. 252/512; 252/513; 252/514; 252/518.1; 427/96; 148/24; 148/25

(58) Field of Classification Search ............... 252/512, 252/513, 514, 518; 427/96; 148/24, 25
See application file for complete search history.

(56) References Cited

U.S. PATENT DOCUMENTS

| 3,915,729 A | 10/1975 | Eustice .................. 106/268 |
| 4,663,079 A | 5/1987 | Yamaguchi et al. ......... 252/512 |
| 5,376,403 A | 12/1994 | Capote et al. ................ 427/96 |

FOREIGN PATENT DOCUMENTS

| JP | 53133799 | 11/1978 |
| JP | 55160072 | 12/1980 |
| WO | 95/13901 | 5/1995 |
| WO | 96/13041 | 5/1996 |
| WO | 96/22670 | 7/1996 |
| WO | 96/30966 | 10/1996 |

*Primary Examiner*—Mark Kopec
*Assistant Examiner*—Derrick G. Hamlin (57) ABSTRACT

A composition for use in the production of metal traces and other metal components of printed circuit boards, wiring boards and the like. The composition includes the following components: (a) a metal powder, (b) a solder powder, (c) a polymer or a monomer which is polymerisable to yield a polymer, wherein the polymer is cross-likable under the action of a chemical cross-linking agent, and (d) a chemical cross-linking agent for the polymer, the cross-linking agent having fluxing properties and being unreactive with the polymer without catalysis. The polymer will generally be an epoxy resin and the cross-linking agent will generally be a polyacid. The composition preferably is one in which the metal powder and/or solder powder generates and/or has adhered thereto a catalyst for the cross-linking agent which is liberated on application of heat.

49 Claims, 2 Drawing Sheets

☐ EPOXY RESIN

▨ Cu

▓ Sn 63 / Pb37

▨ $Cu_3 Sn / Cu_6 Sn_5$

▨ FR-4 SUBSTRATE

PRINTABLE COMPOSITIONS, AND THEIR APPLICATION TO DIELECTRIC SURFACES USED IN THE MANUFACTURE OF PRINTED CIRCUIT BOARDS

This application is a 371 of PCT/IB97/01033 filed Aug. 15, 1997 which claims benefit of Provisional Application Ser. No. 60/024,026 filed Aug. 16, 1996.

The present invention relates generally to printed circuit board (PCB) production and to inks and other compositions to be applied to dielectric substrates in PCB production. The present invention particularly relates to ink and other compositions that are conductive by virtue of containing metal (s), and to the use of such conductive compositions in the manufacture of printed circuit boards.

It is well established that printed circuit boards offer highly cost effective and space saving improvements when used in electrical devices. Prior to the advent of printed circuit boards, it was necessary to run individual wires between each component used in an electrical device. The advent of printed circuit board technology permitted manufacturers who repeatedly utilized the same complex circuit design in a high volume product to (i) eliminate the individual wiring of each component into the system while (ii) providing an integral mechanical support for the circuitry.

More particularly, a printed circuit board may have numerous electrically conductive pathways imprinted on a dielectric substrate, most frequently a glass fibre reinforced phenolic or epoxy resin substrate. The electrical components may then be attached to the printed circuit board with the conductive patterns on the board forming electrical connections thereon.

Heretofore, conventional methods of forming electrical pathways on a printed circuit board were both expensive and time consuming. For example, in one process, the dielectric substrate is coated over its entire surface with a sheet of conducting metal, such as copper or aluminum. This is generally accomplished by utilizing an electroplating technique. The selected pattern or matrix, which will represent the electrical pathways between the components, is then cut into a cloth material such as silk. The cloth material, having the cut-out matrix is then placed on the dielectric substrate which has been previously coated with the conducting material. An etch-resist ink is then rolled over the cloth, with the ink passing through the cut-out pattern and forming an inked matrix on the coated dielectric substrate. The above described method is a conventional silk screen technique. The inked and coated board is then exposed to light which causes the etch-resist ink to become acid resistant. The dielectric substrate is then treated with acid such that all of the metal areas of the board not coated with the ink are etched away leaving just the matrix pattern. The ink itself may then be removed by conventional techniques, thereby leaving the electrically conductive pathways formed on the printed circuit board.

In another method used in the prior art, a catalyst is placed on an uncoated dielectric substrate in the desired wiring pattern. The substrate is then immersed in a charged solution of copper ions, such that the electrical pathways are formed by electrodeposition in the areas where the catalyst was placed.

The conventional methods are (i) time consuming, (ii) expensive, (iii) wasteful of materials and (iv) produce environmentally hazardous and toxic chemicals, primarily spent acids. Not only are numerous steps performed by skilled personnel necessary to produce a printed circuit board, but great amounts of conducting metal are needed for coating an entire dielectric substrate, or to provide an ionic solution.

With a view to seeking simpler and safer application methods for the production of conductive pathways on PCB's, a number of documents have been noted.

Thus, U.S. Pat. No. 4,696,764 discloses use on a dielectric substrate of an electrically conductive adhesive composition having two types of electrically conductive particles with an average particle diameter of at least 1 micron (1 µm). The second type of particles need not be of the same material as the first, and have an average particle diameter of not more than 0.5 µm. U.K. Patent Application GB 2054277 discloses use on a dielectric substrate of a pressure-sensitive electroconductive elastic body of a matrix of electrically insulating material with a metal powder having particular densities, packing fraction, susceptibility to flow and bulk.

From U.S. Pat. No. 4,740,252, there is known a solder paste making use of conductive metallic particles which may be silver, nickel or copper. If copper is used, the particles should be coated with nickel so as to make the surface wettable and to prevent formation of a brittle intermetallic compound on the surface of the particles. In the same field, U.S. Pat. No. 4,888,135 discloses an electrically conductive composition containing copper particles with a silver coating and a titanate coupling agent combined to the copper particles and/or the silver coating material. Moreover, U.S. Pat. No. 4,732,702 discloses an electroconductive resin paste comprising an epoxy resin formed by condensation of a bisphenol compound and a butadiene compound having carboxylic acid terminal groups and an electroconductive filler. The bisphenol compound may be a halogenated bisphenol A reacted with epichlorohydrin.

Japanese Patent 0133799 discloses a conductive paint containing a mixture of binder (such as epoxy resin), conductive metal powder and solder. The abstract of the patent discloses that, when copper is the conductive metal, a binder having fluxing function, such as epoxy-acrylic or phenol resin, is used to remove oxide film on the copper particles. The inventive technique in this document operates by connecting the conductive metal powder to fused solder powder by way of heat treatment, the conductive metal powder and solder powder having a flake shape, and uniformly mixing the composite of conductive metal powder thus produced and solder powder with the binder so as to form a low resistance conductor.

Japanese Patent 0160072 discloses an electroconductive adhesive composition containing copper powder, solder powder and a binder resin. Dependent claims further define this conductive adhesive material as being characterized by a weight ratio of the copper powder to the solder powder preferably in the range from 10:5 to 10:1, and with the solder powder being in semi-molten state at the curing temperature of the thermosetting resin.

Japanese Patent Application JP 57-113505 concerns, more specifically, a conductive ink which may comprise solder-plated copper powder, solder powder, an activating agent, and an organic resin. This conductive composition has a weight ratio of the solder-plated copper powder to the solder powder in the range between 40:60 to 90:10.

U.S. Pat. No. 4,564,563 discloses a solderable composition having silver flakes in a matrix formed from acrylic, vinyl and epoxy monomers.

U.S Pat. No. 4,678,602 discloses a highly conductive styrene resin composition containing a copolymerized unsaturated dicarboxylic acid anhydride and a metallic filler.

U.S. Pat. No. 4,775,500 discloses a method of making an electrically conductive polymeric composite with carbon black as electrically conductive filler.

U.S. Pat. No. 4,786,437 discloses particle filled compositions making use of a pacifier, such as an organotin compound or sulphur bearing compounds, as an interfacial agent between conductive particles and a polymer matrix.

U.S. Pat. No. 4,830,779 discloses an electrically conductive resin composition comprising a resin, a metallic powder, a diphosphonic acid derivative and an alcohol.

U.S. Pat. No. 4,874,548 discloses an electrically conductive adhesive composition comprising an epoxy resin and conductive fibers.

Finally, U.S. Pat. No. 5,376,403 concerns electrically conductive adhesive compositions, and methods for the preparation and use thereof, in which a solder powder, a chemically protected cross-linking agent with fluxing properties and a reactive monomer or polymer are the principal components. Depending upon the intended end use, the compositions comprise various combinations of a relatively high melting metal powder; solder powder; the active cross-linking agent which also serves as a fluxing agent; a resin; and a reactive monomer or polymer. The compositions are useful as improved conductive adhesives, such as for attaching electrical components to electrical circuits: the compositions comprising metal powder with high melting metals are ideally suited for creating the conductive paths on printed circuits. The compositions for forming conductive paths may first be applied to a substrate in the desired pattern of an electrical circuit, and then heated to cure it. During heating, the action of the cross-linking agent and optional reactive monomer or polymer within the mixture fluxes printing fine line circuits. As virtually all circuit boards produced today have traces of 250 microns or less, these products will have a very limited utility. Since the surface area of metal particles increases exponentially as particle size is reduced, the inks made from fine ($\leqq 10$ μ) particles have substantially more surface area, and consequently, substantially more metal oxides that need to be removed to facilitate metallic union, or sintering of the composition. As metallic powders become finer (smaller particles) more aggressive fluxing agents are needed to remove these oxides. The known compositions, therefore, require the addition of very strong fluxing materials and activators to allow the use of fine particles, and fine line printed circuits. These aggressive fluxing materials, and their decomposition products remain in the circuit trace, and can extensively damage the circuit by corrosion, of the metals and degradation of the polymer, and be a source of ionic contamination which will prematurely fail the circuit and electronic assembly.

These strong fluxing agents are also very reactive with the adhesive resins used in these inks, creating a stability problem for the ink composition. These products must thus be used very soon after they are mixed because the acids and acid anhydrides used for fluxing the metals will react with and often crosslink an epoxy resin within days making these compositions unsuitable for production and storage.

The electrically conductive composition described in U.S. Pat. No. 5,376,403 provided a marked improvement over earlier technology by improving electrical conductivity to 10% of that of copper, an order of magnitude improvement over PTF, and by providing a solderable composition that could be printed to produce fine line circuitry, but this product is not without major disadvantages. Thus, printed circuits produced with this material must be processed in an inert environment, preferably a vapour phase soldering machine wherein the heating takes place in the vapour of a high temperature fluorinated fluid. This equipment is expensive, expensive to operate, and scarcely used in the printed circuit industry, limiting the utility of the composition. Moreover, the ink described is based on extensive use of brominated aromatic materials, which at the present time are subject to extensive inquiry into their effects on human health. A proposal has been made to ban their use in the European Polymers Industry.

The salient feature of U.S. Pat. No. 5,376,403 which differentiates from, and improves the compositions taught in Japanese Patents 0133799 and 0160072 and Japanese Patent Application JP57-113505 is the esterification of the acids and acid anhydrides with alcohol to produce a storage stable, chemically protected composition, capable of reversal (di-esterification) with application of heat. In this di-esterification reaction, the alcohols are regenerated as a substantial ($\cong 50\%$) part of the adhesive, which compromises the performance of products mode from this composition as related to bind strength and environmental and chemical resistance.

The processing conditions described for the composition of U.S. Pat. No. 5,376,403 require an involved thermal profile which includes curing at 215° C. and postcure at 150° C. These conditions promote the formation of intermetallic compositions known to degrade the performance of electrical conductors and interconnects by both increasing the resistance to current flow, and embrittling the trace. This problem is exacerbated by additional thermal processing, as is required to produce electronic assemblies.

Accordingly, it is an object of the present invention to provide improvements in the PCB production technology and, in particular, conductive ink compositions and precursors thereof which enable printed circuits to be produced quickly on a low-cost basis appropriate for both short and long production runs.

It is also an object of the present invention to provide improvements in the production of printed circuits with the aim generally of producing fully additive multilayer interconnection.

In one aspect, this invention provides a composition of matter comprising the following components:
  (a) a metal powder,
  (b) a solder powder which melts at a lower temperature than the metal powder,
  (c) a polymer, or a monomer which is polymerisable to yield a polymer, a said polymer being crosslinkable under the action of a chemical cross-linking agent,
  (d) a crosslinking agent for said polymer, the crosslinking agent having fluxing properties and being nonreactive with said polymer without the application of heat and provision of a catalyst for reaction therebetween, the crosslinking agent, as such not reacting with said polymer under storage conditions, and the crosslinking agent being capable of solvating
  (e) metallic oxide and metallic salt catalysts which are formed by heating metallic components (a) and (b) and which promote a rapid crosslinking reaction between said polymer (c) and said crosslinking agent (d) when incorporated in said polymer, as a result of solvation by the crosslinking agent in the presence of heat.

Component (a) is typically a metal powder of high melting point and high electrical conductivity. Component (b), by being a solder powder, is a low melting point constituent. Component (c) is preferably an epoxy resin, in particular a B stage epoxy resin. Component (d) is typically a polycarboxyl compound to be described in detail hereinafter. Finally, component (e) is a metallic oxide or metallic salt formed in situ by oxidation of metal present and may additionally contain an azole, such as benzotriazole, applied to powder (a) in particular as a stability enhancer, but which is also a catalyst for the crosslinking which is liberated on application of heat.

This invention provides, in a second aspect, a composition on, or for application to, a dielectric substrate in a predetermined pattern comprising, in admixture (i) a metallic powder component which includes (a) a solder powder and (b) a metal powder melting at a higher temperature than the solder powder; and (ii) a polycarboxyl compound effective as a fluxing agent for the metallic powder component at a first temperature and as a cross-linking agent for an epoxy resin at a higher second temperature, the polyacid being in contact with such epoxy resin.

Compositions embodying this invention will be described hereinafter in detail and in their uses in terms of those according to the second aspect of the invention. However, it should be noted that compositions according to the first aspect of the invention have, through their embodying the same inventive principle, like uses.

The epoxy resin is generally an additional component of the composition when it is to be a conductive ink composition for use in the production of a printed circuit board. Alternatively, in producing a printed circuit board, an epoxy resin may be applied to a dielectric substrate by, for example, curtain coating or by patterning as a glue line and caused to interact with the metallic powder/polyacid combination of the composition subsequently applied to the dielectric surface.

The composition described herein can be processed in readily available air environment furnaces, contains no environmental or health damaging materials, and requires no post curing (intermetallic producing) processing.

In a third aspect, this invention provides a method of making an electrically conductive circuit on a dielectric surface comprising patterning a substrate with the admixture of metallic powder component and polycarboxyl compound as aforesaid according to the second aspect of the invention, with either the epoxy resin being pre-coated on the substrate or the epoxy resin being incorporated in the patterned composition, and heating the admixture thus patterned to a temperature above the melting point of the solder metal but below the melting point of metal powder (b) being a temperature at which the polycarboxyl compound is thermally stable but able to act as a fluxing agent to achieve metallic sintering and catalyzed crosslinking of the epoxy resin. When, as will be described hereinafter, the metallic powder is treated with an azole such as benzotriazole, such temperature will also be one at which the azole is liberated to take part in catalysis of cross-linking of the epoxy resin.

In a fourth aspect, this invention provides an electrically conductive circuit which comprises a metal film patterned upon a dielectric substrate and adhesively adhered thereto by a cured and cross linked epoxy resin, the metal film resulting from the patterning on the substrate of a composition comprising in admixture, (i) a metallic powder component which includes (a) a solder powder and (b) a metal powder melting at a higher temperature than the solder powder and (ii) a polycarboxyl compound effective as a fluxing agent for the metallic powder component and a cross-linking agent for an epoxy resin, an epoxy resin having been coated or patterned onto the dielectric substrate prior to patterning of said film. Upon heating to a temperature sufficient to melt the solder powder, the polycarboxyl compound will flux the metallic powders, absorbing catalysts formed by oxidation of the metallic powder compound on heating thereof, and contact and mix with the pre-catalysed epoxy resin at the substrate /metallisation interface, incorporating and crosslinking said epoxy resin to provide a strongly adhered patterned metallisation upon the substrate surface. Preferably the epoxy resin is either one which is as a B stage resin or is a resin which can be B staged after application.

When practising the invention in accordance with its second, third and fourth aspects, reliance is placed on the co-use of the three components, components (i) and (ii) identified above and an epoxy resin. In this context, hereinafter, the term "ink" will be used to denote printable compositions comprising components (i) and (ii) as aforesaid and which usually, but not always, will contain epoxy resin. A sophisticated relationship has been found to exist between these components in that the polycarboxyl compound (ii) serves as a fluxing agent for the metallic powder component (i) enabling it to dissolve the metal oxides formed in sufficient amount so that, at elevated temperatures, these metal oxides serve to catalyse a reaction between the epoxy resin and the polycarboxyl compound (ii) then acting as curing agent. Although a simple carboxyl compound could serve as a fluxing agent, a polycarboxyl compound is necessary in the conductive ink composition in order to achieve cross-linking at two or more bonds of the epoxy resin.

Starting with the simplest component, the epoxy resin is preferably one which is liquid at ambient temperature and serves as an adhesive. The preferred epoxy resin is either a diglycidyl ether of bisphenol A or a diglycidyl ether of bisphenol F.

The polycarboxyl compound serves as a fluxing agent for the metallic powders, dissolving metal oxide which is in turn a catalyst for reaction between the epoxy resin and the carboxyl groups of the polycarboxyl compound at elevated temperatures. Such polycarboxyl compound may be a carboxylated polymer, a polycarboxylic acid or a polymer fatty acid, such as a dimerised or trimerised fatty acid. An organic trimer fatty acid having a functionality greater than 1 provides more than one reaction site with the epoxy resin serving to create a macromolecule that provides required adhesion. The aforementioned preferred carboxyl-containing polymers also provide multiple reaction sites.

The polycarboxyl compound serving as a fluxing agent for the metallic powder component removes metal oxide from the metallic powder component. This removal of the metal oxide permits the metal particles to coalesce and provide a continuous metal conductor. Furthermore, the removed metal oxide is produced in sufficient quantity that, in the presence of applied heat, it catalyses a reaction between the epoxy resin and the carboxyl groups on the polycarboxyl compound.

Another beneficial property of the polycarboxyl compounds/epoxy composition is the stability of the composition with respect to reaction and curing during storage under ambient conditions as these compositions are essentially non-reactive at ambient temperatures. This composition is capable of extended shelf life —greater than six months at ambient temperatures.

The carboxyl groups on the polycarboxyl compound are non reactive at ambient temperatures. The composition will only become reactive and cross link when in the presence of heat and catalyst. Catalysts for this reaction are the metal oxides and metal salts. These catalysts are formed by heating the metal powders, which oxidise to produce oxides, the oxides possibly reacting with the polycarboxyl compound to produce salts. Additionally catalysts may be made available with the thermal release of chelating agent (an imidazole) which may have been used to protect and deactivate the copper metal. The catalysts liberated are typically: lead oxide, stannous oxide, organic tin and copper salts, and benzotriazole.

The polycarboxyl compound is preferably thermally stable at 215° C. and has an acid number greater than 200 and a viscosity of less than 0.01 Pa.s (10 centipoise) at 200° C. Preferably such compound is a carboxyl containing polymer, in particular a styrene acrylic acid copolymer. The conductive ink composition preferably contains from 5 to 25% in total of epoxy resin and polycarboxyl compound and from 95 to 75% weight of the metallic powder component. More especially, one part by weight of the mixture of polycarboxyl compound and epoxy resin as used is mixed with approximately 9 parts by weight of metal powder component.

Insofar as the metal powder component is concerned, the solder metal preferably includes a first metal and a second metal, with the first metal having an affinity for the high melting point constituent (metal powder (b)), an oxide of the second metal being a catalyst for the curing of the epoxy resin and the first and second metals being melted together to form a metal film in which is embedded particles of metal powder (b) while the first and second molten metals form a matrix regions between the particles of the high melting point constituent, which matrix is rich in the second metal of the relatively low melting point constituent. In such a case in particular, especially when the epoxy resin is a constituent of the ink composition, the epoxy resin is preferably liquid at ambient temperature.

The preferred metal powder component will be a mixture of three metals. One metal is a high melting point constituent of high electrical conductivity (metal powder (b)) and is typically selected from copper, gold, silver, zinc, aluminium, platinum, palladium, beryllium, rhodium, nickel, cobalt, iron, molybdenum, tungsten and/or a high melting point alloy of two or more of these metals. Such metal is preferably copper powder in the particle size range from 5 to 25 µm, more preferably normally 10 µm copper.

The solder metal provides the other two metals. One of these metals is typically tin, lead, bismuth, cadmium, zinc, gallium, indium, tellurium, mercury, thallium, antimony, selenium and/or an alloy of two or more such metals. The preferred such metal is tin although, when a third metal is not present, it can be lead. When a third metal is present, this is preferably lead and then the two metals constituting the solder metal are preferably tin/lead (Sn-Pb), preferably as eutectic alloy (Sn 63). The particle size of this solder metal is preferably also in the range of from 5 to 25 µm, being nominally 10 µm powder.

Additional components not hitherto specified may be present in the conductive ink compositions of this invention. Thus, improved performance is achieved when the copper powder which is preferably used as metal powder (b) is cleaned and coated with a stability enhancer, otherwise known as surface protectorant, which is an organic chelation agent, preferably an azole such as benzotriazole, whose decomposition products are also catalysts for the reaction between the epoxy resin adhesive and the polycarboxyl compound and serve to bring about high density cross-linking without the need for any post-curing.

Other azole compounds which may be used to chelate metal, in particular copper, and are then released into the polymer matrix at the activation temperature, to serve as a catalyst are imidazoles which to crosslink the epoxy/polycarboxyl compound composition rapidly, providing a "snap cure" of the adhesive system present in a continual process. No post cure or further treatment is necessary.

In considering the use of the conductive ink composition embodying this invention, the following diverse chemical principals should be borne in mind:

(i) the solder metal is preferably a tin/lead alloy which is oxidizable and has a lower melting temperature than the preferred higher melting point metal, copper;

(ii) tin, as preferred solder metal, has, in its molten state, a particularly good affinity for copper;

(iii) tin and lead form, when melted together, a metal film;

(iv) the polycarboxyl compound, preferably styrene acrylic acid copolymer, will flux both copper and tin/lead alloy;

(v) lead oxide and the decomposition products from benzotriazole are catalysts for the reaction between the epoxy resin adhesive and the polycarboxyl compound; and (vi) finally, and this is important in considering the stability of the conductive ink, copper powder catalyses the reaction between the epoxy resin and the polycarboxyl compound. This needs to be eliminated or at least slowed down at ambient temperature.

In the production of printed circuit boards, the conductive ink is patterned on a dielectric substrate, which is normally pre-patterned with the epoxy resin when the epoxy resin is not present in the ink, patterning being effected, in general, by a screen printing process. The substrate, with ink applied, is then heated in an oven, preferably in a vapour phase oven that transfers heat quickly, to a temperature that is (1) above the lower melting temperature of the solder metal but (2) less than the relatively higher melting temperature of metal powder (b), the respective metals being preferably tin/lead and copper. Unless otherwise indicated, these two metal components will be presented hereinafter as representative low and high melting point constituents as aforesaid. With these representative components, in particular, heating may be at 215° C. for five minutes.

The higher melting metal component (i.e. copper) and the metal alloy powder (tin/lead) are both strongly fluxed by the polycarboxyl compound which permits the molten tin to wet the surface of the copper. The chelate compound releases from the surface of the Cu powder providing clean solderable copper surfaces. The tin/lead matrix becomes, in regions between the particles of the copper, rich in lead. A molten metal film coalesces, expelling both the epoxy resin and the polycarboxyl compound to the surfaces of the film. Epoxy resin present in contact with the surfaces of the metal film is catalyzed by the metal oxide, salts and possibly benzotriazole now present at the surface of the metal matrix and becomes rapidly cured and cross-linked. In the meanwhile, all of the carboxyl groups will have reacted with the epoxide groups so as to esterify the carboxyl groups. A highly-electrically-conductive metal film strongly adhering to the dielectric substrate by a non-corrosive cured epoxy composition is then produced.

Thus, two conflicting objectives are satisfied, namely (1) a strong fluxing action which requires both a highly active reducing agent and a highly flowable low viscosity matrix, and (2) a reaction involving the polymer resin which is effective both to neutralise and immobilize the system while achieving adhesion to the substrate. Both of these are met.

The achievement of these objectives is met specifically by the conductive ink composition showing synergism when used in the manufacture of printed circuits. Thus (1) the polycarboxyl compound of the conductive ink serves as a very effective chemical and mechanical flux for (2) the metallic content of the conductive film, permitting coalescesing of the high melting point metal component powdered particles within a metal film as a continuous conducting body having excellent electrical and mechanical properties. During curing of the epoxy resin, an oxide is present on the surface of the metallic film and serves to catalyse curing and cross-linking of this resin-adhesive material and neutralizing of its acidity. Thus, one component promotes a change in the other component and vice versa. The net result of this synergism between resin-adhesive and the metallic components of the conductive ink composition is to produce a high quality metal film that may be strongly adhered to a dielectric substrate by a non-corrosive cured epoxy adhesive.

There is no wastage of materials in the production of printed circuits insofar as the conductive ink is concerned. Moreover, there is no emission of environmentally-harmful liquids or gases. The conductive ink itself is safe, non-toxic and stable on storage. The mechanical and electrical properties of the electrical circuit traces produced with the conductive ink match in quality those of normal (copper) printed circuit traces, typically exhibiting resistivity of less than 25 milliohms per square (at a thickness of 25 μm), more preferably less than 10 milliohms per square (at a thickness of 25 μm). Only small quantities of the conductive ink are required. In itself, the conductive ink is economical both for manufacture and use.

In accordance with the aforementioned fourth aspect of the invention, the stability and shelf life, or pot life, of conductive inks embodying this invention is greatly extended, typically by more than one order of magnitude, by taking certain steps in their preparation.

Firstly, when metal powder (b) of the conductive ink is a copper powder, it is chelated with a very thin coating of a copper deactivator such as benzotriazole applied to the individual particles of the powder. This coating retards oxide or salt formation. The same chelation also serves desirably to prevent the catalytic effect of the metal powder (b), especially copper, from compromising the storage life of the composition. Upon release from the copper at activation temperature, the benzotriazole acts as a powerful catalyst for the curing reaction.

Secondly, an anti-oxidant copper deactivator, preferably oxalyl bis benzylidene hydrazine, is added to the resin to enhance storage stability by preventing copper salts from reacting with the resin. The preferred oxalyl bis benzylidene hydrazine exhibits an inhibitory effect in a copper-containing epoxy resin reacted with a carboxylic resin by exhibiting a greater affinity for the unavoidably occurring copper salts than does the resin. Shelf life of copper-containing resin conductive ink, in particular, is typically increased by the aforementioned more than one order of magnitude when the inhibitor is present in the resin in a preferred concentration in the range of 0.25% to 5%, more preferably 1%, by weight.

For a better understanding of the invention and to show how the same may be carried into effect, reference will now be made to the accompanying drawings to be referred to in the following description and the working examples, in particular. In the drawings.

Hereinafter, again, the invention will be described primarily with respect to the use of copper as high melting metal and a tin/lead alloy, in particular Sn 63, as relatively low melting constituent and the inclusion of epoxy resin in the ink. As already noted, the preferred tin/lead alloy is preferably of a particle size of 25 μm or less and is preferably of a particle size less than 10 μm. The particles of this and other low melting constituents are preferably first cleaned using, for example, a technique to be described in the examples which follow. Such cleaning is preferably to be applied to the high melting metal constituent. The polycarboxyl compound —containing epoxy adhesive component, i.e. mixture of polycarboxyl compound and epoxy compound, (and any optional exothermic compound) of the conductive ink preferably constitutes from 5–25% by weight thereof and the metallic powder component preferably constitutes from 95%–75% by weight thereof. The polycarboxyl compound —containing epoxy adhesive component is particularly preferably present in an amount of 10% by weight of the conductive ink and the metal powder component is then preferably present in an amount of approximately 90% by weight.

Insofar as the metallic powder constituent is concerned, preferably the metal powder (b) (normally copper) constitutes up to 90% by weight, more preferably 67% by weight of the component. The preferred metal alloy component (normally tin/lead) preferably amounts to from <100% to 10% by weight, more preferably amounting to 33%.

The stability of conductive inks embodying this invention during storage and use may be maintained for relatively long periods, and for generally longer times than heretofore. This improved stability helps minimise quality problems in the production of printed circuits using the inks. Improved stability may be achieved in one or both of two ways.

Firstly, metal powder (b), normally copper powder, is chelated with an organic coating, preferably a benzotriazole in an extremely thin coating over the individual particles. This coating neither affects the electrical conductivity nor degrades the solder wetting characteristics of the powder. Such chelating coatings are well known in the art as a means of preventing oxide formation on copper materials and are commonly used to maintain the solderability of copper lands on printed circuit boards. Such coatings have also been employed in copper powder paints to reduce oxidation and to maintain electrical conductivity when conductivity is dependent upon physical contact between individual metal particles in the powder since oxide formation reduces conductivity.

However, in the practice of the present invention, the chelation of the copper also serves to prevent the formation of copper salts which can react with the resin.

Moreover, a novel anti-oxidant copper deactivator may be added to the resin to prevent the reaction of copper salts with the resins. A preferred such deactivator is oxalyl bis benzylidene hydrazine. Copper deactivators, such as this compound, have previously found commercial application in preventing embrittlement of polyethylene hook-up wire when it comes into contact with copper metal. This embrittlement was caused by an oxidated cross-linking and degrading of the polymer by copper salts. However, no previous use of a copper deactivator in combination with epoxy resin has hitherto been described.

The preferred oxalyl bis benzylidene hydrazine material exhibits an inhibitory effect in a copper-containing epoxy resin reacted with a carboxylic resin. The inhibitor is effective by its exhibiting a greater affinity for the copper salts than the resin. Shelf life of copper-containing resin conductive ink is then typically increased by more than one order of magnitude when the inhibitor is present in the resin in a preferred concentration in the range of 0.25% to 5%, more preferably 1% by weight.

Figure 1:
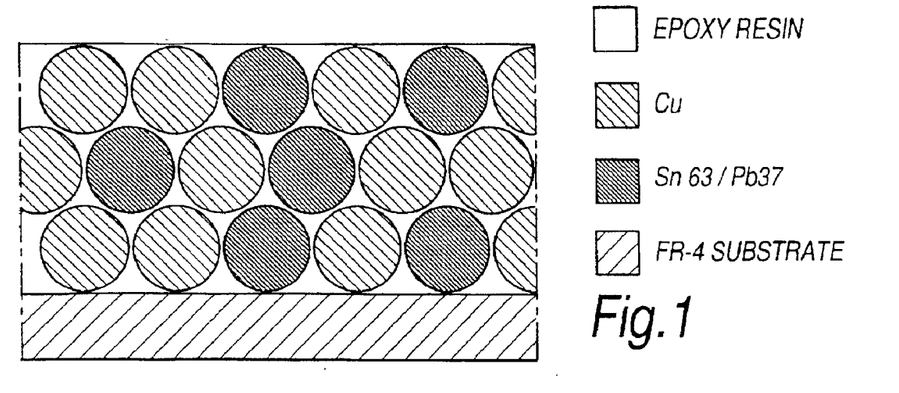
FIG. 1 is a diagrammatic representation of a cross-section through an epoxy resin-containing conductive ink embodying this invention when applied to a substrate but prior to heating thereof to cause flow of the relatively low melting metal constituent.
Figure 2:
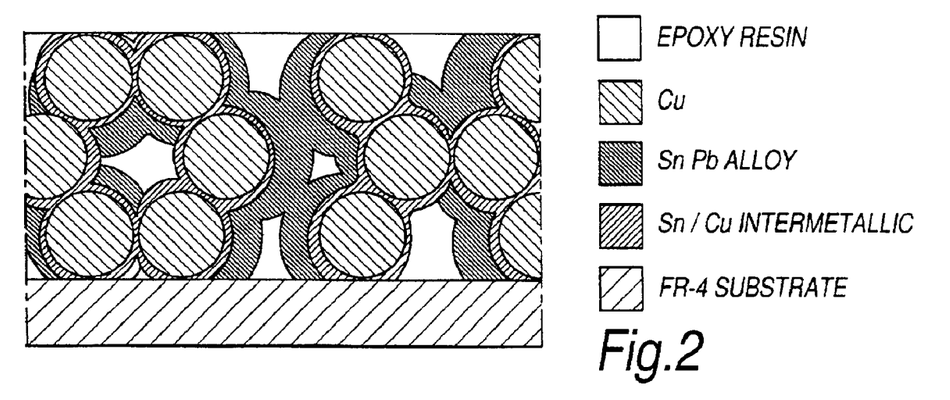
FIG. 2 is a like view to that of FIG. 1 but showing the condition of the ink after flow has occurred.
Figure 3:
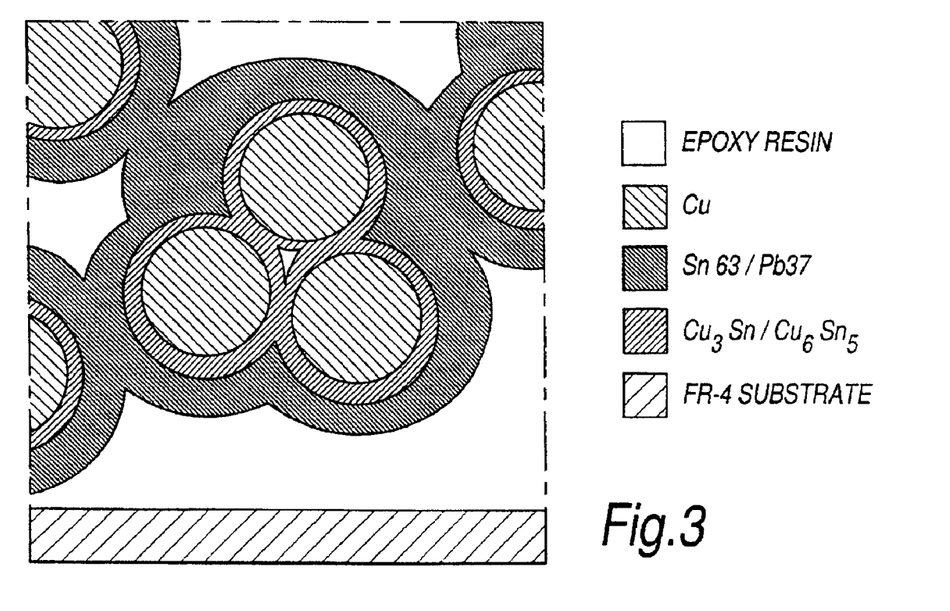
FIG. 3 shows in greater detail a typical portion of the applied ink after such flow has taken polycarboxyl compound alone, as the case may be, and the optional exothermic compound, if used, is mixed with the constituents of the metallic powder component. The solder metal thereof is susceptible to oxidation and is preferably an alloy of tin and lead in which it is the lead which is particularly subject to oxidation. Tin in such an alloy has an affinity for the higher melting metal constituent. The oxide as aforesaid is a catalyst for the curing of the epoxy resin adhesive. The relatively low melting constituent of the metallic powder component is to form a metal film on melting.

A printed circuit board may be produced using the conductive ink of the invention by patterning on a dielectric substrate, normally by a screen-printing process. The applied ink will have the appearance shown in cross-section in FIG. 1. The substrate with the conductive ink composition patterned thereon is then heated to a temperature intermediate the melting points of the two constituents of the metallic powder component. The acid component then serves as a fluxing agent to the oxidizable higher melting metal powder i.e. metal powder (b), as well as for the solder powder constituent. It removes oxide from the surface of particles of the metals present, permitting the relatively lower melting point metal to wet the surface of the first metal to which it has a considerable affinity when the respective metals are tin and copper. The ink will now be as shown in FIG. 2. FIG. 3 shows the condition of the ink in greater detail with reference to the use of Cu and Sn63/Pb37 for the two metal powders.

The present invention has been described generally herein with respect to the additive provision of circuit patterns by printing of the inventive ink on a dielectric substrate with epoxy resin being present either in the ink or as a coating applied to the substrate and serving to act as an adhesive for the patterned circuit to the substrate. This principle may also be applied to the production of multilayer printed wiring boards in which a plurality of layers is produced in accordance with the method of the invention and laminated together with interposition of dielectric layers between conductive layers. The metal traces produced must here be resistant to melting when further heating takes place to achieve bonding together of the layers. Particularly with such multi-layer structures, there is a need to provide interconnections between the circuits of individual layers. Vias for this purpose are typically formed in a PCB by for example drilling, punching, laser drilling or etching in a circuit after an adhesive has been applied to the dielectric side of the circuit, and provide electrical connection between circuits at different levels in an overall structure or serve merely to provide a connection between applied components and a printed circuit. There is a need for there to be a good filling degree of conductive material in the via and good adhesion of such material to the wall of the via. Via filling compositions are frequently of a pasty nature and enter the vias by application of a via-filling composition to the printed circuit board and application of a doctor blade to ensure entry into the via. Compositions embodying this invention which contain an epoxy resin meet the aforesaid requirements of via formation eminently owing to the quality of adhesion attainable through the presence of metal oxide produced on reaction between the polycarboxyl compound fluxing agent and the metal powder, which adhesion may be enhanced as a result of other cross-linking enhancing factors described hereinabove.

Thus, this invention also provides a multilayer wiring board in which vias connecting electrically conductive circuits contain a metal filling resulting from filling the vias with a composition according to the first aspect of the invention having the epoxy resin contained therein and heating to a temperature between said first and second temperatures to cure and crosslink the epoxy resin and cause the via filling to adhere to the via walls.

Although reference has been made hitherto to the printing of compositions embodying this invention on a dielectric substrate and the achieving of a good adhesion thereto, adhesion may be enhanced by provision of channel formations patterned on the substrate.

Thus in one procedure, the epoxy resin is pre-coated on the dielectric substrate, a photoimageable layer is applied to the adhesive layer, the photoimageable layer is subjected to a photoimaging and developing process to form a channel pattern in the photoimageable layer corresponding to the circuit, said admixture is introduced into the channel pattern and the dielectric substrate is heated to said temperature to achieve substantially complete crosslinking of the epoxy resin.

In an alternative procedure, a photoimageable layer is applied to the dielectric substrate and subsequently subjected to a photoimaging and developing process to form a channel pattern. Said admixture, additionally containing the epoxy resin, is introduced into the channel pattern and the dielectric substrate is heated to said temperature to achieve substantially complete crosslinking of the epoxy resin.

This principle of channel patterning may be applied to each of the plurality of layers involved when producing a multilayer wiring board. Further particulars of the channel patterning technique are to be found in WO-96/22670.

The compositions of this invention find use in a number of areas of electronics and PCB/wiring board technology to be described hereinafter. Specific circuit features to be indicated hereinafter will be formed of a composition embodying this invention having the epoxy resin incorporated therein and will have been heated in-situ to a temperature sufficient to melt the relatively low melting point constituent but below the melting point of the high melting point constituent, being a temperature at which the polycarboxyl compound is thermally stable, to achieve metallic sintering and substantial crosslinking of the epoxy resin.

For example, the compositions of this invention may be used in this way as an alternative to soldered wires for the repair and/or modification of conventional etched copper printed wiring boards.

Although described primarily as having use in the production of laminar circuits as in printed circuit boards, because compositions embodying this invention have practical use as polymer thick films, the composition may then have a structural function. For example the compositions may be employed in the formation of thermal transfer pillars in the construction of semi-conductor packages, multichip modules, etc. The compositions may also be used to form conductive terminations for printed potentiometer tracks giving extremely low contact resistance through the wiper of the potentiometer assembly by being extremely resistant to wear.

Particularly insofar as the compositions of the invention may provide a conductive adhesive, they may then function as a replacement for solder in the joining of electronic components to conductive "lands" on substrates. The compositions may also be utilised to operate simultaneously as conductive tracers and as conductive adhesive on a substrate, thus requiring no "lands" for the electrical connection of electronic components. In this case, cross-linking should not be completed before applying the electronic components.

A further area of use of compositions involving this invention is as a shielding layer on printed wiring boards for the suppression of electromagnetic interference (EMI)/radio-frequency interference (rfi). Such uses have particularly relevance to the production of cellular telephones.

The invention may be better understood by reference to the following examples which are intended for purposes of illustration and are not to be construed as in any way limiting the scope of the present invention, which is defined in the claims appended hereto. The following materials were used when carrying out the Examples:

| Materials | Source |
|---|---|
| SnPb solder alloy (63:37), 10–25 μm particle size | Multicore Solders Ltd. |
| Copper powder, <20 μm particle size | ACuPowder International |
| Entek Plus 106A, benzotriazole passivation system for copper | Enthone-OMI |
| "SF-50" silver flake, ≦0.4 μm particle size, optionally added to the ink formulation to modify rheology | Degussa |
| Joncryl 682, styrene-acrylic copolymer which is the cross-linking agent and primary fluxing agent | SC Johnson |
| Epikote 862, (uncrosslinked) epoxy resin | Shell |
| OABH inhibitor, anti-oxidant copper deactivating agent (oxalyl bis benzylidene hydrazine) | Eastman |
| Modaflo, a rheology modifier optionally added to formulations to enhance flow of epoxy resin prior to cross-linking | Monsanto |
| Silquest A-187 Silane, a coupling agent optionally added to formulations to promote better adhesion | OSI Specialties |
| 3, 3-Thiodipropionic acid, an optional secondary activator | |
| Butyl carbitol, solvent | Aldrich |

Inks were prepared in several stages in the Examples:
* metal powder preparation
* styrene-acrylic copolymer solution preparation
* activator system preparation
* ink base preparation
* fully formulated ink preparation
* final adjustment of ink.

EXAMPLE 1

Preparation of Metal Powders

The copper powder was immersed in 5% v/v sulphuric acid at 80° C. until it exhibited a bright salmon colouration. It was then collected by filtration and thoroughly rinsed with deionised water and dried. Cleaned copper powder was treated with Entek Plus 106A. The solder powder was cleaned in a 10% w/w aqueous solution of ammonium bifluoride before being collected, rinsed and dried.

Preparation of Styrene-Acrylic Copolymer Solution 50 g of butyl carbitol were added to 100 g of Joncryl 682. This mixture was stirred over a hotplate at 120° C. until a clear pale yellow solution was obtained. This was stored in an air tight bottle at room temperature pending use in the next stage.

Preparation of Ink Base 75 g of the styrene-acrylic copolymer solution were placed in a 400 cm³ beaker. 50 g of Epikote 862 were added, along with 0.5 g of Modaflo, 0.25 g of Silquest A-187 and 1.0 g OABH. This mixture was homogenised with a spatula and stored in a sealed plastic jar pending ink preparation.

Preparation of Activator System

The styrene-acrylic copolymer solution did not confer sufficient fluxing activity. Therefore, a secondary activator was incorporated. This was prepared as follows:

5 g of 3,3-thiodipropionic acid were added to 10 g of butyl carbitol. The mixture was warmed to form a colourless solution (although there was precipitation on cooling).

Preparation of Fully Formulated Ink 10 g of ink base was weighed into a 125 cm³ beaker. 60 g of cleaned/passivated copper powder, and 30 g of cleaned solder powder were added. These ingredients were mixed with a spatula for about ten minutes.

Final Adjustment

The rheology of the ink was adjusted to facilitate printing by the addition of extra butyl carbitol and SF-50 silver flake.

Sintering was investigated by floating a thin film of ink smeared across a microscope slide on a solder bath at 235° C. Sintering (ie solder-copper wetting) is indicated by a change in colour from brown to grey. This only occurred when a small amount of the prepared activation system was added; this was first homogenised in view of the precipitation which occurred.

Assessment of Fully Formulated Ink

The composition of the fully formulated ink is given in Table 1.

TABLE 1

Composition Of The Fully Formulated Ink
All data are in wt %.

| | Amount |
|---|---|
| Ink Component | |
| Ink base | 9.70 |
| Activator system | 0.77 |
| Butyl carbitol | 1.90 |
| Copper powder | 58.10 |
| Solder powder | 29.00 |
| SF50 silver flake | 0.48 |
| Activator System | |
| 3, 3-Thiodipropionic acid | 33.33 |
| Butyl carbitol | 66.67 |
| Ink Base | |
| Styrene-acrylic copolymer solution | 59.15 |
| Epikote 862 | 39.45 |
| Modaflo | 0.40 |
| Silquest A-187 | 0.2 |
| OABH | 0.80 |
| Styrene-acrylic copolymer solution | |
| Joncryl 682 | 66.67 |
| Butyl carbitol | 33.33 |

The ink was assessed in several ways:
* fineness of grind
* viscosity profile
* printing characteristics
* electrical properties of sintered ink The fineness of grind measurement indicated some agglomerated particles above 50 μm. These broke down during testing.

Ink viscosity at 25° C. was measured using a Brookfield HBT viscometer fitted with a an SC4–14/16R spindle. The results are tabulated in Table 2:

TABLE 2

| Speed (rpm) | Fineline Ink (cps) |
|---|---|
| 1 | 250,000 |
| 2.5 | 200,000 |
| 5 | 180,000 |
| 10 | 150,000 |
| 20 | 130,000 |
| 50 | 90,500 |
| 100 | 69,000 |
| 50 | 80,000 |
| 20 | 100,000 |
| 10 | 120,000 |
| 5 | 140,000 |
| 2.5 | 160,000 |
| 1 | 200,000 |

To test printing characteristics, ink was printed with a DEK245 printer onto FR4 substrate which had been degreased with acetone and stored for two days in an air-circulating oven at 60° C. to remove trapped moisture. Three screens were used. The results are shown in Table 3.

TABLE 3

| | Screen | | |
|---|---|---|---|
| | 1 | 2 | 3 |
| Mesh/inch | 180 | 180 | 230 |
| Mesh type | Stainless steel | Stainless steel | Stainless steel |
| Mesh orientation/° | 90 | 45 | 90 |
| Emulsion thickness | 15 (97–112) | 12 (95–107) | 12 (77–89)/μm |
| Printing parameters | | | |
| Printer speed /mm s$^{-1}$ | 44 | 44 | 44 |
| Squeegee type | Diamond, 45° | Diamond, 45° | Diamond, 45° |
| Squeegee pressure /Kg | 5.5–5.6 | 4.6–4.7 | 6.1–6.2 |
| Substrate type | Blank FR4 | Cu/FR4 Au/Ni/FR4 | Blank FR4 |

The ink rolled well on all screens with no skidding. Print definition was good, and there was no bleeding with two of the three screens. Four thou lines with the third screen were ill defined, probably due to the FOG (four thou =100 μm, i.e. twice the size of some agglomerated particles); in addition, there was very slight bleeding.

Printed PCBs were dried for 5 minutes in an air-circulating oven at 120° C. to remove solvent. The thickness of the dried ink was then measured using a Taylor-Hobson Talysurf 10 surface texture measuring instrument:

| | Screen | | |
|---|---|---|---|
| | 1 | 2 | 3 |
| Thickness/μm | 40–42 | 56–58 | 32–35 |

Finally, printed PCBs were reflowed in a vapour phase reflow oven at 215° C. for 4 minutes with a short (1 minute) dwell time at 50° C. before and after.

Successful flow of the solder to achieve a coalesced metal film was achieved in all cases. Further measurements using the Taylor-Hobson Talysurf 10 surface texture measuring instrument indicated no modification in print thickness.

The sintered ink was assessed for electrical resistivity using a four-probe method, with the print thickness normalised to 25 μm:

| | Screen | |
|---|---|---|
| | 3 | 1 |
| Resistivity /mOhm/square | 10.5 | 15 |

Solderability was investigated by applying low solids liquid flux to the sintered ink, followed by brief exposure to 60/40 Sn/Pb solder at 235° C. The sintered ink was successfully soldered.

Figure 4:
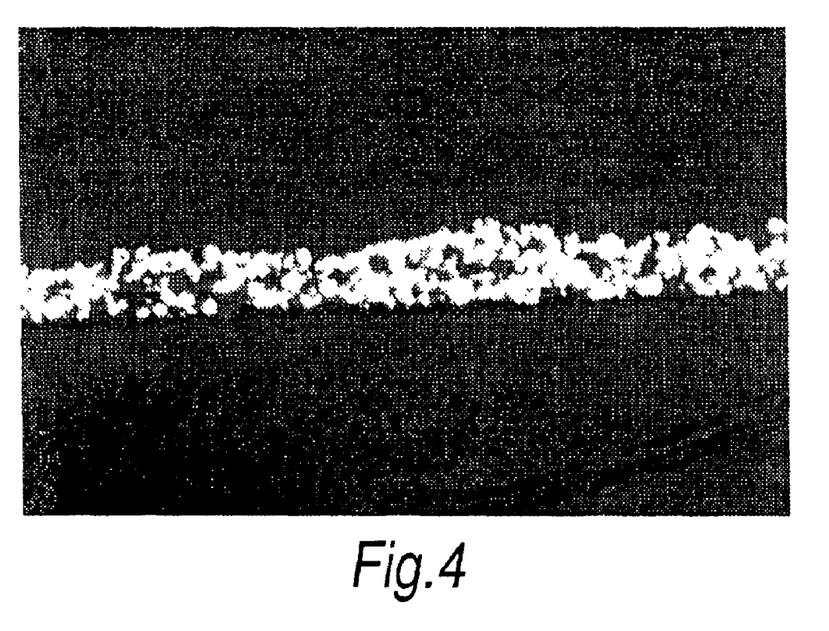
Figure 5:
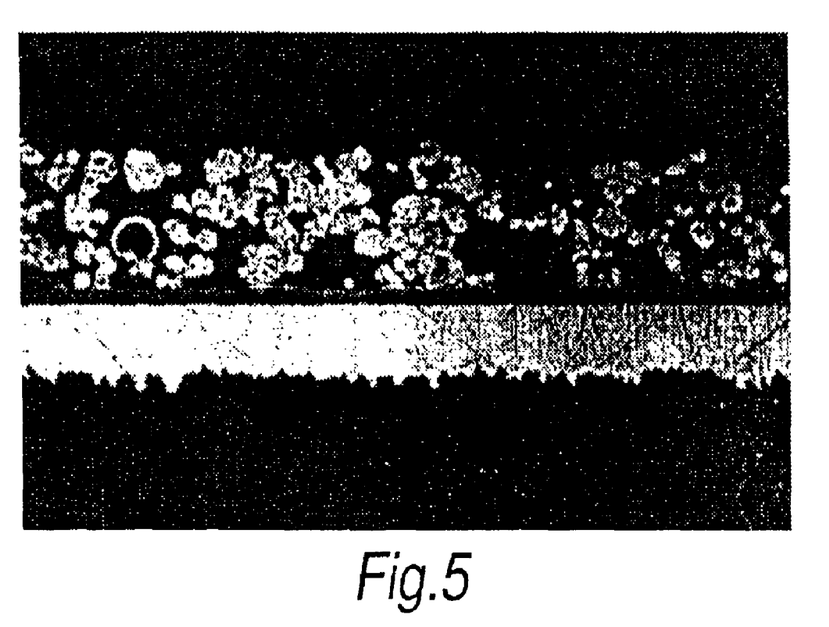

The character of the conductive layer was investigated by microscopic examination of a sectioned specimen at 300× magnification (FIG. 4). This suggested a good degree of metal fusion. Ability to wet metallic surfaces during sintering was assessed using the patterns printed with Screen 2 (FIG. 5). Both the copper and gold surfaces became coated with solder. This is important in considering the present invention as a conductive "adhesive" for joining electronic components to printed circuit boards.

Finally, there was a brief shelf life study. A one gram sample was placed in a air circulating oven at 60° C. for 24 hours. There was no sign of modified physical properties or premature curing.

EXAMPLE 2

A specimen of the ink from Example 1 was successfully sintered under air using a Sikama hot belt reflow station. The resistivity was the same as that given by an identical sample sintered in parallel using a vapour phase reflow oven.

EXAMPLES 3–6

Following the success of the preceding examples, further batches of ink were prepared in the same manner as in Example 1 and used to investigate the role of the various components and metal powder treatments. Typical data given in Table 4 underline the complexity of the formulation process with both composition and treatment impacting upon stability, sintering capability and resistivity. The data presented are for illustrative purposes only.

TABLE 4

Modification of Ink Composition
All amounts are in grams.

| | Example | | | |
|---|---|---|---|---|
| | 3 | 4 | 5 | 6 |
| Ink base | | | | |
| Styrene-acrylic copolymer solution* | 29.58 | 29.58 | 29.58 | 29.58 |
| Epikote 862 | 19.72 | 19.72 | 19.72 | 19.72 |
| Modaflo | 0.2 | 0.2 | 0.2 | 0.2 |
| Silquest A-187 | 0.1 | 0.1 | — | — |
| OABH | — | 0.4 | — | 0.4 |
| 3, 3-Thiodipropionic acid | 0.13 | 0.13 | 0.13 | 0.13 |
| Butyl carbitol | 1.2 | 1.2 | 1.2 | 1.2 |
| Ink base properties | | | | |
| Viscosity at 20 rpm/cP | 8500 | 8900 | 11200 | 9400 |

TABLE 4-continued

Modification of Ink Composition
All amounts are in grams.

| | Example | | | |
|---|---|---|---|---|
| | 3 | 4 | 5 | 6 |
| Stability after 2 weeks | OK | OK | OK | OK |
| Stability after 8 weeks | Becoming thick | Slightly sticky | Slightly sticky | Slightly sticky |
| Ink | | | | |
| Ink base | 5.00 | 5.00 | 5.00 | 5.00 |
| Copper powder | 22.50 | 22.50 | 30.00[1] | 30.00[2] |
| Solder powder | 21.35 | 21.35[2] | 14.23[2] | 14.23 |
| Extra butyl carbitol | 1.50 | — | 1.50 | — |
| Ink properties | | | | |
| Stability after 1 week | Slight skin | | Poor | PoorOK |
| Stability after 3 weeks | Early cure stage | | — | — |
| Sintering capability | 90% | None | 70% | 50% |
| Resistivity of sintered ink /mOhm/square/25 μm | 18.8 | 3132 | 19.8 | 25.5 |

*Exactly the same as in the first example.
[1]Copper cleaned and Entek Plus 106A coated (otherwise copper is cleaned but not passivated)
[2]Cleaned solder alloy A prerequisite for all chemicals used in the manufacture of electrical products is ionic cleanliness: this minimises the possibility of in-service reliability problems. Therefore, inks sintered during this stage of the product development process were also subjected to ionic contamination assessment using the Multicore CM11 Contaminometer. All exhibited low ionic contamination below 0.2 μg NaCl eq/cm$^2$, easily in line with the demands of industry standards such as MIL-P-28809A.

The invention claimed is:

1. A composition of matter comprising:
   (a) a metal powder,
   (b) a solder powder which melts at lower temperature than the metal powder,
   (c) a polymer, or a monomer which is polymerisable to yield a polymer, said polymer being crosslinkable under the action of a chemical cross-linking agent,
   (d) a cross-linking agent for said polymer, the cross-linking agent being selected from carboxylated polymers, polycarboxylic acids as such and polymer fatty acids so as to provide multiple reaction sites which lack chemical protection, the cross-linking agent having fluxing properties and being substantially non-reactive at said sites with said polymer without the application of heat and provision of a catalyst for reaction therebetween, the cross-linking agent not reacting with said polymer under storage conditions, and the cross-linking agent being capable of solvating,
   (e) metallic oxide and metallic salt catalyst which are formed by heating metallic components (a) and (b) and which promote a rapid cross-linking reaction between said polymer (e) and said cross-linking agent (d) when incorporated in said polymer, as a result of solvation of said catalyst by the cross-linking agent in the presence of heat, said composition being under storage conditions such that it does not, possess a temperature sufficient for such solvating and crosslinking reaction to occur.

2. A composition according to claim 1 wherein said metal powder is selected from Au, Ag, Cu, Zn, Al, Pd, Pt, Rh, Fe, Ni, Co, Mo, W, Be, and alloys thereof.

3. A composition according to claim 2 wherein said metal powder is copper.

4. A composition according to claim 1 wherein said solder powder is selected from Sn, Bi, Pb, Cd, Zn, Ga, In, Te, Hu, Sb, Tl and alloys thereof.

5. A composition according to claim 1 wherein said solder powder is Sn63Pb37.

6. A composition according to claim 1 wherein said cross-linking agent is selected from carboxylated polymers, dimer fatty acids and trimer fatty acids.

7. A composition according to claim 6 wherein said cross-linking agent is a styrene-acrylic acid copolymer, and/or an organic trimer acid, having a functionality greater than 1.

8. A composition according to claim 1 wherein said catalyst is formed by heating and oxidation of solder powder and dissolved by a fluxing agent.

9. A composition according to claim 8 wherein said catalyst is metallic oxide catalyst formed by heating and oxidation of tin and/or lead powder and dissolved by a fluxing agent.

10. A composition according to claim 1 wherein said catalyst is a metallic salt catalyst formed by heating and oxidation of tin and/or lead powder and dissolved by a fluxing agent.

11. A composition according to claim 10 wherein said catalyst is a tin salt catalyst formed by heating tin to form a tin oxide and reaction of the later with resin or solvent to produce a tin salt.

12. A composition according to claim 10 wherein said catalyst is a copper salt catalyst formed by heating copper to form a copper oxide and reaction of the later with resin or solvent to produce a tin salt.

13. A composition according to claim 1 wherein an organic chelating agent is adhered to the metal powder as stability enhancer and the organic chelating agent is decomposes at solder melting temperature to provide decomposition products which dissolve in the fluxing agent as additional catalyst for the chemical cross-linking agent.

14. A composition according to claim 13 wherein said organic chelating agent is an azole chelating agent.

15. A composition according to claim 13 wherein said organic chelating agent is benzotriazole.

16. A composition according to claim 1, further comprising a copper salt deactivator as a stability enhancer.

17. A composition according to claim 16 wherein said copper salt deactivator is oxayl bis benzxylidene.

18. A composition for application to a dielectric substrate a predetermined pattern and comprising, in admixture
   (i) a metallic powder component which includes (a) a solder powder and (b) a metal powder melting at a higher temperature than the solder powder,
   (ii) a polycarboxyl compound effective as a fluxing agent for the metallic powder component at a first elevated temperature and as a cross-linking agent for an epoxy resin at a higher second temperature, the polycarboxyl compound being selected from carboxylated polymers, polycarboxylic acids as such and polymer fatty acids providing multiple reaction sites which lack chemical protection, and
   (iii) an epoxy resin, which composition is at a temperature below said first elevated temperature.

19. A composition according to claim 18, wherein the polycarboxyl compound is thermally stable to 215° C. and has an acid number greater than 200 and a viscosity less than 0.01 Pa.s (10 centipoise) at 200° C.

20. A composition according to claim 18, wherein the polymer fatty acid is a dimer or trimer fatty acid.

21. A composition according to claim 18, wherein the polycarboxyl carboxylated polymer is a styrene-acrylic acid copolymer.

22. A composition according to claim 18, wherein the metal powder component contains up to 90% by weight of the metal powder (b) and from <100 to 10% by weight of the solder powder.

23. A composition according to claim 18, wherein metal powder (b) is selected from Au, Ag, Cu, Zn, Al, Pd, Pt, Rh, Fe, Ni, Co, Mo, W, Be, and alloys thereof.

24. A composition according to claim 18, wherein solder powder is selected from Sn, Bi, Pb, Cd, Zn, Ga, In, Te, Hu, Sb, Tl and alloys thereof.

25. A composition according to claim 18, wherein the solder powder includes a first metal and a second metal, the first metal having an affinity for the high melting point constituent, an oxide of the second metal being a catalyst for the curing of the epoxy resin and the first and second metals being melted together to form a metal film in which is embedded particles of the high melting point constituent while the first and second molten metals form a matrix on regions between the particles of the high melting point constituent, which matrix is rich in the second metal of the relatively low melting point constituent.

26. A composition according to claim 18, wherein the solder powder is a tin/lead alloy.

27. A composition according to claim 18, wherein the metal powder (b) is copper.

28. A composition according to claim 18, wherein the chelation agent is benzotiazole.

29. A composition according to claim 18, wherein the epoxy resin consists essentially of an epoxy resin that is liquid at ambient temperature.

30. A composition according to claim 18, which contains, in percent by weight, from 5 to 50% in total of epoxy resin and polycarboxyl compound and 95 to 50% by weight the metallic powder component.

31. A composition according to claim 18 wherein the metal powder (b) is a copper powder which has been cleaned and coated with a stability enhancing copper deactivator which is a chelation agent for the copper and a high temperature catalyst for the crosslinking of the epoxy resin.

32. A composition according to claim 31, wherein the chelation agent is an azole compound.

33. A composition according to claim 32 wherein the chelation agent is benzotriazole.

34. A composition according to claim 18, wherein the metal powder (b) is a copper powder and the composition additionally includes anti-oxidant copper deactivating agent.

35. A composition according to claim 18, wherein metal powder is copper powder and the composition additionally includes oxalyl bis benzylidene hydrazine as the anti-oxidant copper deactivating agent.

36. A composition comprising in admixture:
(i) a metallic powder component which includes (a) a solder powder and (b) a metal powder melting at a higher temperature than the solder powder;
(ii) a polycarboxyl compound effective as a fluxing agent for the metallic powder component at a first elevated temperature and as a cross-linking agent for an epoxy resin at a higher second temperature, the polycarboxyl compound being selected from carboxylated polymers, polycarboxylic acids as such and polymer fatty acids providing multiple reaction sites which lack chemical protection, the composition being applied to a dielectric substrate to which an epoxy resin has been pre-applied, the composition thus applied being at a temperature below said first elevated temperature.

37. A composition according to claim 36, wherein the epoxy resin is printed on the substrate in a predetermined pattern.

38. A composition according to claim 36, wherein the polycarboxyl compound is thermally stable to 215° C. and has an acid number greater than 200 and a viscosity less than 0.01 Pas (10 centipoise) at 200° C.

39. A composition according to claim 36, wherein the polymer fatty acid is a dimer or trimer fatty acid.

40. A composition according to claim 36, wherein the carboxylated polymer is a styrene-acrylic acid copolymer.

41. A con-position according to claim 36, wherein the metal powder component contains up to 90% by weight of metal powder (b) and from <100 to 10% by weight of the solder powder.

42. A composition according to claim 36, wherein metal powder (b) is a metal selected from Au, Ag, Cu, Zn, Al, Pd, Pt, Rh, Fe, Ni, Co, Mo, W, Be, and alloys thereof.

43. A composition according to claim 36, wherein the solder powder is selected from Sn, Bi, Pb, Cd, Zn, Ga, In, Te, Hu, Sb, Tl and alloys thereof.

44. A composition according to claim 36, wherein the solder powder is a tin/lead alloy.

45. A composition according to claim 36, wherein the metal powder (b) is copper.

46. A composition according to claim 36, wherein the metallic powder component has particles of a size less than 25 μm.

47. A composition according to claim 36, wherein the metal powder (b) is copper powder and the composition additionally includes an anti-oxidant copper deactivating agent.

48. A composition according to claim 36, wherein the metal powder is copper powder and the composition additionally includes oxalyl bis benzylidene hydrazine as an anti-oxidant copper deactivating agent.

49. A composition of matter comprising:
a metal powder;
a solder powder;
wherein the metal powder and/or the solder powder under application of heat ultimately produce a catalyst;
a polymeric or a monomeric resin cross-linkable under the action of a cross-linking agent,
a polymeric cross-linking agent for said resin, the cross-linking
having fluxing properties, and
being by nature of its polymeric form unreactive with the resin without heat and catalysis;
wherein the produced catalyst catalyzes cross-linking of the resin by the polymeric cross-linking agent; and
wherein the composition is self-catalyzing, the polymeric cross-linking agent producing on application of heat the catalyst that serves to catalyze the cross-linking of the resin.

* * * * *